Patented May 15, 1951

2,552,608

UNITED STATES PATENT OFFICE 2,552,608

HALOGENATED AROMATIC HYDROCARBONS AND PROCESS FOR MAKING SAME

Arthur J. Warner, North Caldwell, N. J., assignor to International Standard Electric Corporation, New York, N. Y., a corporation of Delaware No Drawing. Application March 27, 1947,
Serial No. 737,734

7 Claims. (Cl. 260—649)

This invention relates generally to novel halogenated aromatic hydrocarbons and to processes for obtaining same from the corresponding hydrocarbons by chemical reaction with the halogen; in particular, the invention is concerned with certain novel halogenated compounds of the indan series.

The novel compounds according to this invention are represented by the structural formula:

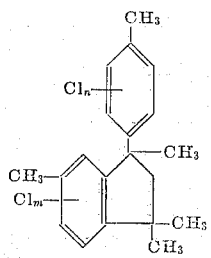

wherein $m$ and $n$ are of the class consisting of zero and integers, the sum of $m$ and $n$ being an integer less than eight.

The compounds according to this invention are useful in heat transfer devices because of their low vapor pressures, high boiling points and good thermal conductivities; they are also useful in plasticizing certain types of synthetic resins particularly cellulose esters and ethers polymerized unsaturated hydrocarbons and substitution products thereof, such as cellulose acetate, ethyl cellulose, polystyrene, polyvinyl chloride and the like; they can also be used in impregnating so called "oil filled" condensers, in potting transformers, and in saturating electrical cables. Other industrial applications of the compounds according to this invention may include use of the lower members of the series as the hydraulic media in power transmission devices, and use in the compounding of high temperature and/or extreme pressure lubricants.

These compounds range in form and appearance from mobile oily liquids to colorless crystals and hard brittle permanently thermoplastic resins. The flash and fire point of the higher compounds in the series are of a magnitude greater than 300° C. and even the lowest member has a flash point exceeding 150° C. They are soluble in a wide range of common organic solvents such as carbon tetrachloride, benzene and similar aromatic hydrocarbons, simple aliphatic alcohols and the like. Each of the compounds of this series has unusual stability and possesses outstanding electrical properties making them particularly useful in the manufacture of electrical apparatus, notably where high dielectric constants and low power factors at power frequencies are desirable.

In accordance with the present invention it is preferred to prepare the members of this novel class of substances by treating the corresponding hydrocarbons with chlorine in the absence of light and at a temperature below about 30° C., and this treatment preferably takes place in a substantially inert liquid organic solvent in the presence of a catalyst of the type which promotes nuclear chlorination in preference to side chain chlorination. Among the solvents satisfactory for this purpose are carbon tetrachloride, tetrachloroethane, chloroform and the like. Satisfactory catalysts for this purpose include ferric trichloride, antimony trichloride, iodine and the like. The satisfactory operating temperatures include ordinary room temperature and lower temperatures, the optimum condition being a temperature in the range of about 15° to 25° C. Lower temperatures, in general, are less desirable because the rate of reaction and the solubility of the hydrocarbon in the solvent are decreased. Higher temperatures are unsatisfactory because of the formation of undesired byproducts, particularly side-chain halogenated materials, which also occurs if the reaction is not performed in the absence of light.

As will be understood by those versed in the field to which this invention relates, the chlorination of hydrocarbons yields a mixture of chlorinated homologs which can thereafter be separated by methods now conventional in organic chemical manufacture. In practice of the present invention, this separation of the reaction products can be accomplished by distillation, preferably under reduced pressure.

The starting material used in the process according to this invention is represented by the structural formula:

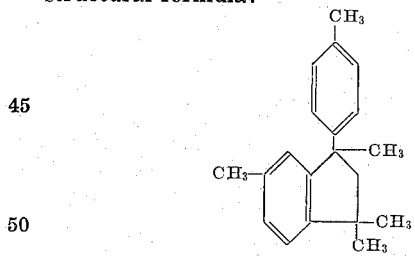

1 : 3 : 3 : 6-tetramethyl-1-(4'-methyl-phenyl)-indan

This compound can be prepared by any convenient and appropriate method of organic synthesis, for example, by treating alpha methyl para methyl vinylbenzene with an activated earth catalyst in the absence of a solvent, at a temperature greater than 200° C.

To facilitate a fuller and more complete understanding of the subject matter of this invention and how the hereindescribed invented compounds can be prepared by practice of the invented process, certain specific examples herewith follow, but it is clearly to be understood that these examples are provided by way of illustration and not by way of limitation.

*Example 1*

About 1980 grams (7½ mols) of solid 1:3:3:6-tetramethyl-1-(4' methyl-phenyl-indan and about 10 grams of antimony trichloride are dissolved in approximately 500 milliliters of carbon tetrachloride at room temperature. The solution is placed in a reaction vessel provided with an agitator and with means for introducing chlorine and for removing hydrogen chloride and, while maintaining the reaction mixture at a temperature of 15 to 25 C., chlorine is reacted with the solution in the absence of light until 533 grams (7½ mols) of chlorine have reacted. At the end of the reaction the desired product, the monochloro substitution product of 1:3:3:6-tetramethyl-1-(4' methyl-phenyl)-indan, which is the predominant component of the reaction mixture, is separated by fractional distillation under reduced pressure. This material has the following characteristic properties:

| | |
|---|---|
| Molecular weight | 299.649 |
| Density (g/ml. 26° C.) | 1.039 |
| Viscosity (sec. Saybolt 100° C. ASTM–D–88) | 47.5 |
| Refractive index ($N_D^{20°\ C.}$) | 1.5683 |
| Boiling point (° C. 1–2 mm. Hg) | 164–171 |

*Example 2*

The process according to Example 1 above is repeated except that instead of reacting equimolecular proportions of chlorine and the hydrocarbon starting material, two mols of chlorine per mol of hydrocarbon are reacted. The principal product so obtained, after separation from other reaction products and purification by usual procedures, is found to be dichloro substituted 1:3:3:6-tetramethyl-1-(4' methyl phenyl)-indan having the following properties:

| | |
|---|---|
| Refractive index ($N_D^{20°\ C.}$) | 334.098 |
| Density | 1.5760 |
| Viscosity (secs. Saybolt ASTM–D–88) | 1.103 (25° C.) |
| Molecular weight | 113.0 (100° C.) |

*Example 3*

The process according to Example 1 above is repeated except that instead of reacting equimolecular proportions of chlorine and the hydrocarbon starting material, three mols of chlorine per mol of hydrocarbon are reacted. The principal product so obtained, after separation from other reaction products and purification by usual procedures, is found to be trichloro substituted 1:3:3:6-tetramethyl-1-(4' methyl phenyl)-indan having the following properties:

| | |
|---|---|
| Refractive index ($N_D^{37.8°\ C.}$) | 368.547 |
| Density | 1.5793 |
| Viscosity (secs. Saybolt ASTM–D–88) | 1.171 (25° C.) |
| Molecular weight | 145.5 (100° C.) |

*Example 4*

The process according to Example 1 above is repeated except that instead of reacting equimolecular proportions of chlorine and the hydrocarbon starting material, four mols of chlorine per mol of hydrocarbon are reacted. The principal product so obtained, after separation from other reaction products and purification by usual procedures, is found to be tetrachloro substituted 1:3:3:6-tetramethyl-1-(4'-methyl phenyl)-indan having the following properties:

| | |
|---|---|
| Refractive index ($N_D^{100°\ C.}$) | 402.996 |
| Density | 1.5625 |
| Viscosity (secs. Saybolt ASTM–D–88) | 1.208 (22° C.) |
| Molecular weight | 207.0 (100° C.) |

*Example 5*

The process according to Example 1 above is repeated except that instead of reacting equimolecular proportions of chlorine and the hydrocarbons starting material, five mols of chlorine per mol of hydrocarbon are reacted. The principal product so obtained, after separation from other reaction products and purification by usual procedures, is found to be pentachloro substituted 1:3:3:6-tetramethyl-1-(4' methyl phenyl)-indan having the following properties:

| | |
|---|---|
| Molecular weight | 437.445 |
| Refractive index ($N_D^{100°\ C.}$) | 1.5780 |
| Density | 1.293 (22° C.) |
| Viscosity (secs. Saybolt ASTM–D–88) | 1574.0 (100° C.) |

*Example 6*

The process according to Example 1 above is repeated except that instead of reacting equimolecular proportions of chlorine and the hydrocarbon starting material, six mols of chlorine per mol of hydrocarbon are reacted. The principal product so obtained, after separation from other reaction products and purification by usual procedures, is found to be hexachloro substituted 1:3:3:6-tetramethyl-1-(4'-methyl phenyl)-indan having the following properties:

| | |
|---|---|
| Molecular weight | 471.894 |
| Refractive index ($N_D^{100°\ C.}$) | 1.5804 |
| Density | 1.321 (22° C.) |

*Example 7*

The process according to Example 1 above is repeated except that instead of reacting equimolecular proportions of chlorine and the hydrocarbon starting material, seven mols of chlorine per mol of hydrocarbon are reacted. The principal product so obtained, after separation from other reaction products and purification by usual procedures, is found to be heptachloro substituted 1:3:3:6-tetramethyl-1-(4'methyl phenyl)-indan having the following properties:

| | |
|---|---|
| Molecular weight | 506.343 |
| Refractive index ($N_D^{100°\ C.}$) | 1.5875 |
| Density | 1.356 |

Attempted further chlorination of this product under these conditions resulted in no reaction, indicating that all nuclear hydrogen atoms were substituted by chlorine.

It will be apparent to those versed in the art to which this invention relates that modifications may be made in the procedures above described without departing from the spirit of this invention and such modifications are within the scope of the subjoined claims.

I claim:
1. The process which comprises treating 1:3:3:6 tetramethyl-1-(4'-methyl-phenyl)-indan with chlorine, characterized in that the treatment is effected in the dark, at a temperature below about 30° C. in a substantially inert liquid organic solvent, and in the presence of a catalyst of the type which promotes nuclear chlorination in preference to side chain chlorination, the treatment continuing until at least one chlorine atom per molecule of starting hydrocarbon is introduced.

2. The product obtained by treating 1:3:3:6 tetramethyl - 1 - (4' - methyl - phenyl) - indan with chlorine in the dark, at a temperature below about 30° C. in the presence of a catalyst of the type which promotes nuclear chlorination, in preference to said chain chlorination, the chlorination, continuing until at least one chlorine atom per molecule of starting hydro-carbon is introduced.

3. The product obtained by treating 1:3:3:6 tetramethyl - 1 - (4' - methyl - phenyl) - indan with chlorine in the dark, at a temperature below about 30° C. in the presence of a catalyst of the type which promotes nuclear chlorination, in preference to said chain chlorination, the chlorination continuing until an average of one chlorine atom per molecule of starting hydro-carbon is introduced.

4. The product obtained by treating 1:3:3:6 tetramethyl - 1 - (4' - methyl - phenyl) - indan with chlorine in the dark, at a temperature below about 30° C. in the presence of a catalyst of the type which promotes nuclear chlorination, in preference to said chain chlorination, the chlorination continuing until an average of two chlorine atoms per molecule of starting hydro-carbon is introduced.

5. The product obtained by treating 1:3:3:6 tetramethyl - 1 - (4' - methyl - phenyl) - indan with chlorine in the dark, at a temperature below about 30° C. in the presence of a catalyst of the type which promotes nuclear chlorination, in preference to said chain chlorination, the chlorination continuing until an average of three chlorine atoms per molecule of starting hydrocarbon is introduced.

6. The product obtained by treating 1:3:3:6 tetramethyl - 1 - (4' - methyl - phenyl) - indan with chlorine in the dark, at a temperature below about 30° C. in the presence of a catalyst of the type which promotes nuclear chlorination, in preference to said chain chlorination, the chlorination continuing until an average of four chlorine atoms per molecule of starting hydro-carbon is introduced.

7. The product obtained by treating 1:3:3:6 tetramethyl - 1 - (4' - methyl - phenyl) - indan with chlorine in the dark, at a temperature below about 30° C. in the presence of a catalyst of the type which promotes nuclear chlorination, in preference to said chain chlorination, the chlorination continuing until an average of five chlorine atoms per molecule of starting hydro-carbon is introduced.

ARTHUR J. WARNER.

REFERENCES CITED

The following references are of record in the file of this patent:

UNITED STATES PATENTS

| Number | Name | Date |
|---|---|---|
| 1,835,754 | Britton et al. | Dec. 8, 1931 |
| 1,890,772 | Dykstra | Dec. 13, 1932 |
| 2,423,415 | Soday | July 1, 1947 |